United States Patent Office 2,918,980
Patented Dec. 29, 1959

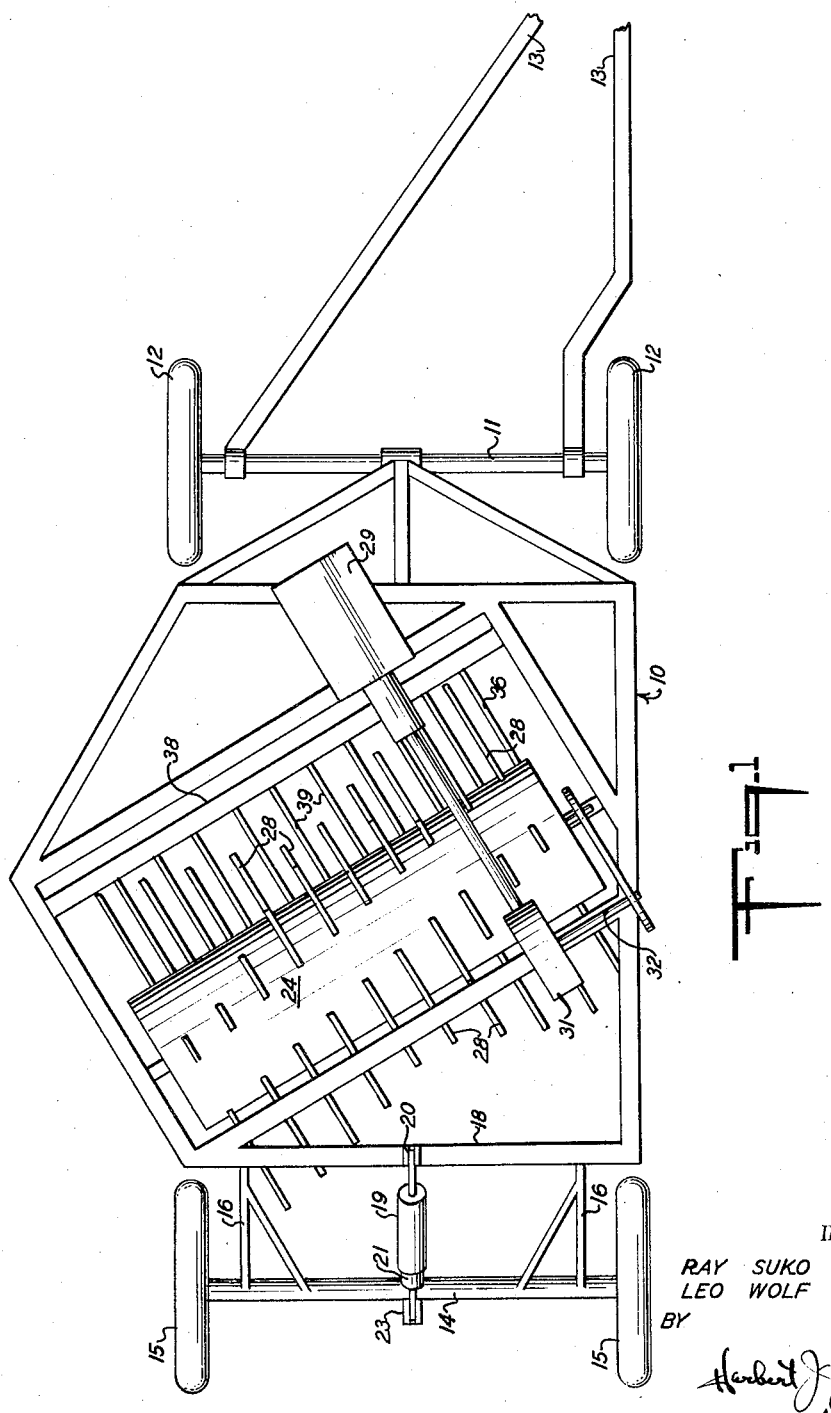

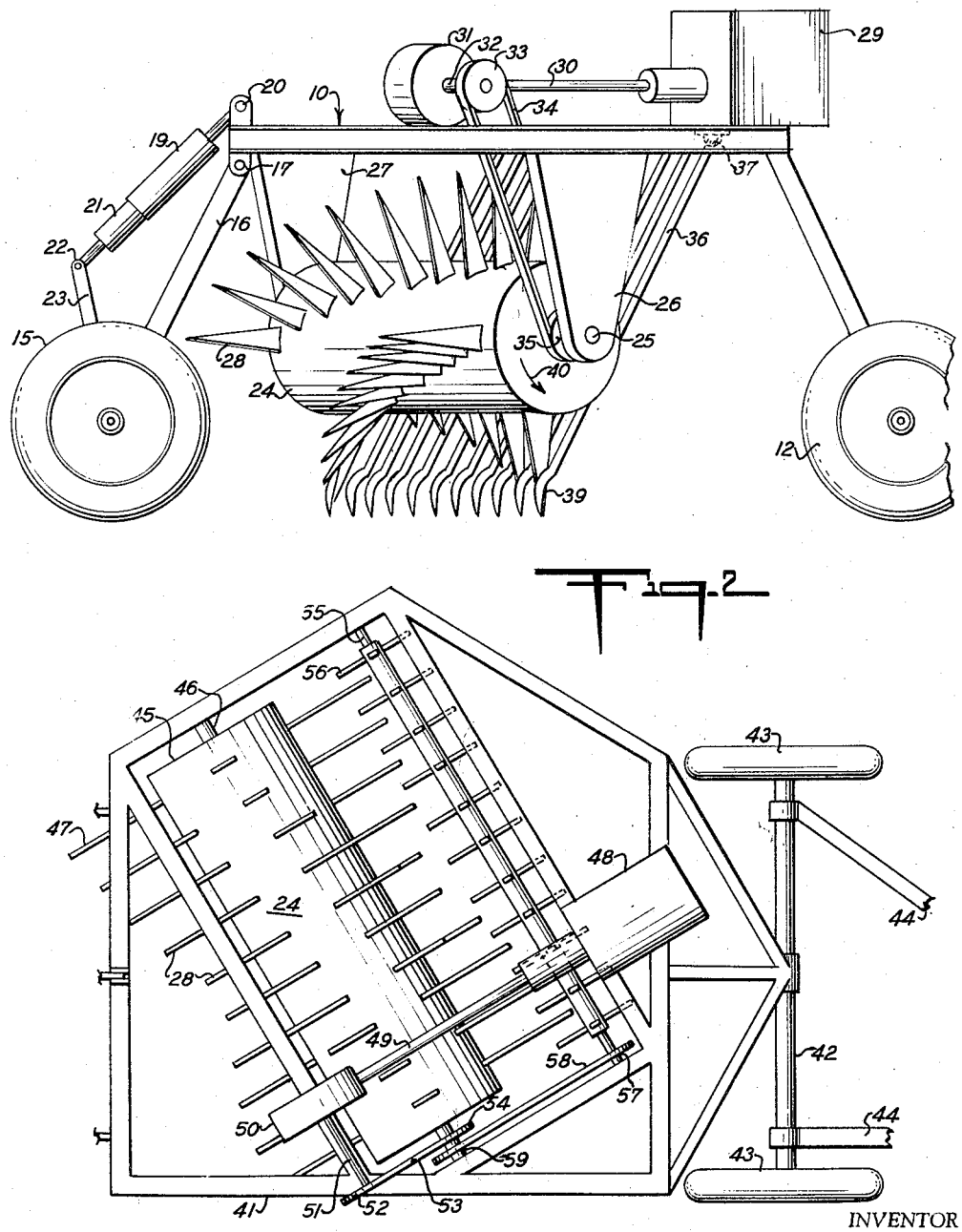

2,918,980

LAND-CLEARING APPARATUS

Ray Suko and Leo Wolf, Odessa, Wash.

Application April 5, 1956, Serial No. 576,426

3 Claims. (Cl. 172—29)

This invention relates to agriculture and more particularly to a land-clearing apparatus designed to uproot objects buried in the ground and to collect such objects as well as other objects resting on the surface of the ground and deposit the same in a windrow to one side of the apparatus as the same travels over the ground.

Heretofore, land has commonly been cleared for agriculture or other purposes by digging out roots or other objects buried beneath the surface of the ground by hand or by the use of plows or other similar apparatus and thereafter collecting these objects either manually or by the use of power-driven rakes or other apparatus designed to collect such objects. This has required the use of various types of apparatus and there has not been available a single combined apparatus which would accomplish all of these functions or one which would both uproot objects buried in the ground and at the same time collect the same as well as other objects resting on the surface of the ground and deposit the same in a manner to facilitate future collection and removal.

It is accordingly an object of this invention to provide a land-clearing apparatus which may be conveniently and economically manufactured from readily available materials and which will provide a device which may be attached to a towing vehicle such as a tractor and moved over the ground to perform a complete land-clearing operation.

A further object of the invention is the provision of a land-clearing apparatus in the form of a vehicle having a chassis to be towed over the ground and including a series of revolving teeth for penetrating the ground and uprooting objects buried therein and at the same time for collecting such objects as well as objects resting on the surface of the ground and depositing the same in a windrow for future collection and removal.

A still further object of the invention is the provision of a land-clearing apparatus including a vehicle having a chassis from which is supported a series of rotatable teeth for penetrating the ground and uprooting objects buried therein and which means is provided for varying the depth of penetration of such teeth.

Another object of the invention is the provision of a land-clearing apparatus including a vehicle having a chassis from which is supported a series of rotating teeth for penetrating the earth and uprooting objects buried therein and in which a means is provided for dislodging objects impaled on the teeth or wedged between such teeth.

A further object of the invention is the provision of a land-clearing apparatus including a vehicle having a chassis from which is supported a series of rotatable teeth, such teeth being carried by a drum with the axis of rotation of the drum disposed at an angle to the path of movement of the vehicle in such a manner that objects uprooted from the ground by the teeth or collected from the surface of the ground will be deposited in a windrow at one side of the vehicle.

A still further object of the invention is the provision of a land-clearing apparatus including a vehicle having a chassis and a series of rotatable teeth supported from the chassis there being a power plant on the chassis for rotating the teeth and a plurality of individually pivoted bars suspended from the chassis and disposed between the teeth to dislodge objects impaled thereon or wedged there between.

Another object of the invention is the provision of a land-clearing apparatus in the form of a vehicle having a chassis from which is supported a series of rotatable teeth for penetrating the earth and uprooting objects buried therein and in which a second series of rotatable teeth is provided for dislodging objects impaled on first teeth or wedged there between.

Further objects and advantages of the invention will be apparent from the following description taken in conjunction with the accompanying drawing wherein;

Fig. 1 is a top plan view of a land-clearing apparatus constructed in accordance with this invention;

Fig. 2 a side elevational view of the apparatus shown in Fig. 1;

Fig. 3 a top plan view similar to Fig. 1 and showing a modified form of the land-clearing apparatus in which a series of rotatable teeth or prongs are utilized to dislodge objects from the primary teeth; and Fig. 4 an end elevational view of the prongs for clearing objects from the earth penetrating teeth.

With continued reference to the drawing there is shown in Figs. 1 and 2 an apparatus constructed in accordance with this invention and which may well comprise a chassis 10 provided with a front axle 11 on which is rotatably mounted ground engaging front wheels 12. Secured to the front axle 11 in any suitable manner is a draw-bar 13 which may be attached to a towing vehicle for pulling the chassis 10 over the ground. A rear axle 14 serves to rotatably mount ground engaging wheels 15 and bars 16 are secured to the axle 14 in any suitable manner and extend upwardly and are pivotally mounted at 17 on the rear cross member 18 of the chassis 10.

The axle 14 may be moved upwardly or downwardly in order to adjust the height of the chassis 10 above the ground by means of a fluid pressure actuated cylinder 19 pivotally mounted at 20 on the cross member 18 of the chassis 10, the cylinder 19 having a piston 21 which is pivotally attached at 22 to a bar 23 secured to the rear axle 14 in any suitable manner. As will be seen from an inspection of Fig. 2 retraction of the piston 21 within the cylinder 19 will result in moving the rear axle 14 and ground engaging wheels 15 upwardly thereby lowering the chassis 10 toward the ground and projection of the piston 21 from the cylinder 19 will result in moving the rear axle 14 and wheels 15 downwardly to raise the chassis 10 to a greater height above the ground.

An elongated drum 24 having a central shaft 25 is rotatably mounted on brackets 26 and 27 depending from the chassis 10 and as will be noted from an inspection of Figs. 1 and 2 the axis of rotation of the drum 24 is at an angle to the path of movement of the chassis 10 over the ground. The purpose of this angular arrangement will be later described. Extending from the surface of drum 24 are a plurality of radially disposed spirally arranged teeth 28 and such teeth are intended to penetrate the ground a predetermined amount depending upon the height of the chassis 10 above the ground.

A power plant 29 in the form of an internal combustion engine or other suitable power supplying means may be mounted on the chassis 10 and connected through a dry shaft 30 with a gear box 31 from which projects a jack shaft 32. Fixed to the shaft 32 is a pulley or sprocket 33 which engages a drive belt or chain 34 which in turn engages a pulley or sprocket 35 fixed to the shaft 25 of the drum 24. A clutch or other suitable coupling means, not shown, may be supplied between the power plant 29 and drive shaft 30 in order to control rotation of the shaft 25 and drum 24 carried thereby.

During operation of the apparatus of this invention objects frequently become impaled on the teeth 28 or wedged between adjacent teeth and in order to clear the same and maintain efficient operation of the apparatus there is provided teeth clearing means in the form of a plurality of downwardly and rearwardly extending bars 36 each bar being individually pivotally mounted as at 37 on a cross member 38 of the chassis 10. A bar 36 is disposed between each adjacent pair of teeth 28 and the lower ends 39 of the bars 36 are curved as shown in Fig. 2 to facilitate clearing of the teeth 28.

In operation the apparatus above described is attached to any suitable towing vehicle through the draw bar 13 and the fluid pressure operated cylinder 19 is actuated to position the chassis 10 at the desired height above the ground in order that the teeth 28 will penetrate the ground to the desired depth. The power plant 29 is coupled through the shaft 30, gear box 31 and belt 34 to the shaft 25 thereby driving the drum 24 and teeth 28 carried thereby in the direction of the arrow 40 in Fig. 2. As the apparatus moves over the ground the teeth 28 will penetrate the same and remove roots or other objects buried in the ground and at the same time the teeth 28 will operate much in the manner of a side delivery rake to collect the objects removed from the ground as well as any objects resting on the surface of the ground and due to the angular dispostion of the drum 24 the collected objects will move toward the trailing end of the drum 24 and be deposited in a windrow at one side of the apparatus. In this manner all of the objects are collected in a single row to be thereafter picked up and removed in any suitable manner. Any objects which may be impaled on the teeth 28 or wedged there between will be cleared therefrom by the bars 36 in order that all the teeth 28 will be clear prior to penetrating the ground.

A slightly modified form of the apparatus is shown in Figs. 3 and 4 and in this form the invention there may be provided a chassis 41 having a front axle 42 on which are rotatably mounted ground engaging wheels 43 and attached to the axle 42 in any suitable manner is draw bar 44 which may be utilized to couple the chassis 41 to a suitable towing vehicle. There is also provided a rear axle and ground engaging wheels which are adjustable to vary the height of the chassis 41 above the ground but such rear axle and wheels together with the supporting and adjusting means therefore is not shown in Fig. 3 but is substantially identical with the structure shown in Figs. 1 and 2 and described above.

Rotatably mounted below the chassis 41 is an elongated drum 45 carried by a shaft 46 and fixed to the drum 45 are a plurality of spirally arranged ground penetrating teeth 47 which are disposed and operate in the same manner as the teeth 28 in the form of the invention described above. A power plant 48 is mounted on chassis 41 and this power plant is coupled through a drive shaft 49 with a gear box 50 from which projects a jack shaft 51 carrying a pulley or sprocket 52 which engages a belt or chain 53 which in turn engages a pulley or sprocket 54 fixed to the shaft 46 carrying the drum 45.

A shaft 55 is rotatably mounted on the chassis 41 substantially parallel to the shaft 46 and fixed to the shaft 55 are a plurality of axially spaced rows of circumferentially disposed prongs 56, there being one row of such prongs disposed between each adjacent pair of earth penetrating teeth 47. Fixed to the shaft 55 is a pulley or sprocket 57 which engages a belt or chain 58 which in turn engages a pulley or sprocket 59 fixed to the shaft 46 thereby driving the shaft 55 and prongs 56 carried thereby in a direction opposite to the direction of rotation of the shaft 46 and drum 45. While the shaft 55 is shown as being driven from the shaft 46, obviously if desired, shaft 45 may be driven directly from the jack shaft 51 or from the power plant 48 in any suitable manner.

The operation of the modified form of the apparatus shown in Figs. 3 and 4 is substantially identical with that described above in connection with the first form of the invention the only difference being that the teeth clearing means in the form of the rotatable prongs 56 operates to remove objects impaled on the teeth 47 or wedged there between by continuously rotating with relation to the teeth 47 thereby engaging such objects and removing the same therefrom in order that the teeth 47 will be cleared prior to penetrating the ground.

It will be seen that by the above described invention there has been provided a relatively simple yet highly efficient apparatus for clearing land which operates to remove objects such as roots, stones and the like from beneath the surface of the ground and to collect these objects as well as other objects such as trees, branches, or other debris from the surface of the ground and deposit all of these objects in a windrow at one side of the apparatus. Obviously such objects may be then conveniently collected and carried away as desired. The apparatus may be made sufficiently rugged to withstand the forces to which the same may be subjected during use and also it will be obvious that little skill labor is required in the manufacture thereof that consequently manufacturing costs will be maintained at a minimum.

It will be obvious to those skilled in the art that various changes may be made in the invention without departing from the sphere and scope thereof and therefore the invention is not limited by that which is shown in the drawing and described in the specification but only as indicated in the appended claims.

What is claimed is:

1. Land clearing apparatus comprising a chassis, ground engaging front wheels on said chassis, vertically adjustable ground engaging rear wheels on said chassis, fluid pressure operated means for adjusting said rear wheels to adjust the height of said chassis, a draw bar for coupling said front wheels to a towing vehicle, an elongated drum, means rotatably mounting said drum below said chassis with the axis of rotation of said drum disposed at an angle to the path of movement of said chassis, a plurality of spirally disposed ground penetrating teeth secured to the periphery of said drum, a power plant mounted on said chassis, drive means connecting said power plant and said drum to drive the same with said teeth moving relative to the ground in the same direction as the direction of movement of said chassis and teeth clearing means comprising a plurality of downwardly and rearwardly extending bars, said bars being individually pivotally mounted on said chassis forwardly of said drum, there being one of said bars extending between each adjacent pair of teeth whereby upon movement of said chassis along the ground and rotation of said drum said teeth will penetrate the ground to remove roots or other objects and simultaneously collect objects on the surface of the ground and deposit the same in a windrow to one side of said chassis, said bars serving to dislodge objects impaled on or wedged between said teeth and said fluid pressure means serving to adjust the depth of penetration of said teeth.

2. Land clearing apparatus comprising a chassis, ground engaging front wheels on said chassis, vertically adjustable ground engaging rear wheels on said chassis, fluid pressure operated means for adjusting said rear wheels to adjust the height of said chassis, means for coupling said front wheels to a towing vehicle, an elongated drum, means rotatably mounting said drum below said chassis with the axis of rotation of said drum disposed at an angle to the path of movement of said chassis, a plurality of spirally disposed ground penetrating teeth secured to said drum, a power plant mounted on said chassis, drive means connecting said power plant and said drum to drive the same with said teeth moving relative to the ground in the same direction as the direction of movement of said chassis and teeth clearing means comprising a plurality of downwardly and rearwardly extending bars, said bars being individually pivotally mounted on said chassis forwardly of said drum, there being one of said bars extending between each adjacent pair of teeth whereby upon movement of said chassis along the ground and rotation of said drum said teeth will penetrate the ground to remove roots or other objects and simultaneously collect objects on the surface of the ground and deposit the same in a windrow to one side of said chassis, said bars serving to dislodge objects impaled on or wedged between said teeth and said fluid pressure means serving to adjust the depth of penetration of said teeth.

3. Land clearing apparatus comprising a chassis, ground engaging front wheels on said chassis, vertically adjustable ground engaging rear wheels on said chassis, means to adjust the height of said chassis, means for coupling said front wheels to a towing vehicle, an elongated drum, means rotatably mounting said drum below said chassis with the axis of rotation of said drum disposed at an angle to the path of movement of said chassis, a plurality of spirally disposed ground penetrating teeth secured to said drum, a power plant mounted on said chassis, drive means connecting said power plant and said drum to drive the same with said teeth moving relative to the ground in the same direction as the direction of movement of said chassis and teeth clearing means comprising a plurality of downwardly and rearwardly extending bars, said bars being individually pivotally mounted on said chassis forwardly of said drum, there being one of said bars extending between each adjacent pair of teeth whereby upon movement of said chassis along the ground and rotation of said drum said teeth will penetrate the ground to remove roots or other objects and simultaneously collect objects on the surface of the ground and deposit the same in a windrow to one side of said chassis, said bars serving to dislodge objects impaled on or wedged between said teeth and said means to adjust the height of said chassis serving to adjust the depth of the penetration of said teeth.

References Cited in the file of this patent

UNITED STATES PATENTS

| | | |
|---|---|---|
| 955,297 | Van Nostrand | Apr. 19, 1910 |
| 1,176,098 | Robbins | Mar. 21, 1916 |
| 1,197,086 | Waters | Sept. 5, 1916 |
| 1,745,903 | Millar | Feb. 4, 1930 |
| 2,787,943 | Browning | Apr. 9, 1957 |